Dec. 27, 1966   J. H. HOLLYDAY   3,293,831
AIR CLEANER
Filed June 20, 1963

INVENTOR.
JAMES H. HOLLYDAY
BY
Joseph A. Brown
ATTORNEY

United States Patent Office 3,293,831
Patented Dec. 27, 1966

3,293,831
AIR CLEANER
James H. Hollyday, New Holland, Pa., assignor to Sperry Rand Corporation, New Holland, Pa., a corporation of Delaware
Filed June 20, 1963, Ser. No. 289,289
5 Claims. (Cl. 55—290)

This invention relates to air cleaners for combustion engines.

One object of this invention is to provide a combustion engine air cleaner having a screen which is continually rotated to have material discharged from it and providing an inlet through which clean air is supplied to the engine.

Another object of this invention is to provide a combustion engine air cleaner having a screen which travels to present successive clean sections to an air intake duct to the engine.

A further object of this invention is to provide a combustion engine air cleaner particularly adapted for use on agricultural implements and other environments where air borne, light material is a problem.

A further object of this invention is to provide an air cleaner of the character described which is simply constructed and inexpensive to manufacture.

Other objects of this invention will be apparent hereinafter from the specification and from the recital in the appended claims.

Figure 1:
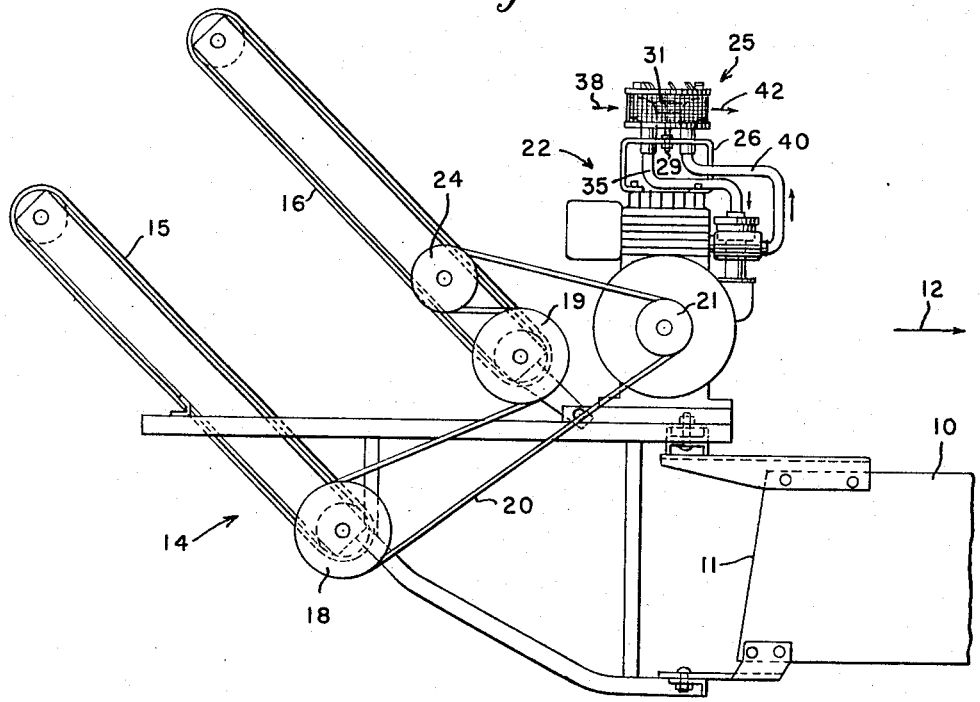
FIG. 1 shows a combustion engine as used to drive a bale thrower mounted on the bale case of a baler, such engine having an air cleaner constructed according to this invention.

Referring now to the drawing by numerals of reference, and first to FIG. 1, 10 denotes the bale case of a baler having a rearward end 11 from which bales are discharged. The baler travels forwardly in the direction indicated by the arrow 12. The discharged bales are adapted to be received by a bale thrower generally denoted 14 and having endless belts 15 and 16 which engage, respectively, the bottom and top of each bale to traject it to a trailing wagon. Conveyor 15 has a sheave 18 and conveyor 16 has a sheave 19 driven by an endless drive belt 20 which extends around output sheave 21 of internal combustion engine 22. Belt 20 is maintained in driving engagement with the sheaves 18 and 19 by a belt tightener 24.

Figure 2:
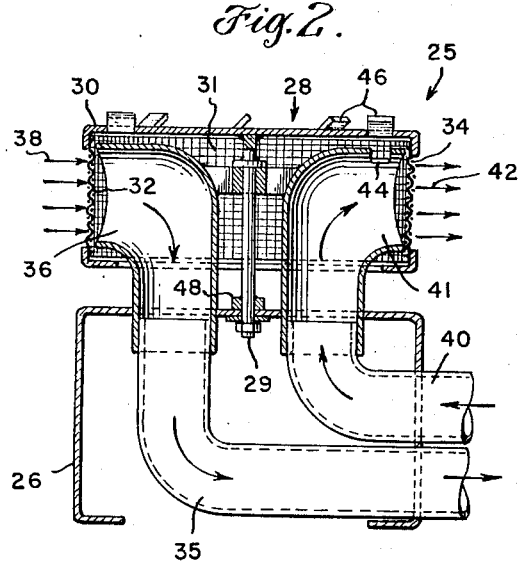
FIG. 2 is a longitudinal, part vertical section and part side elevation of the air cleaner.
Figure 3:
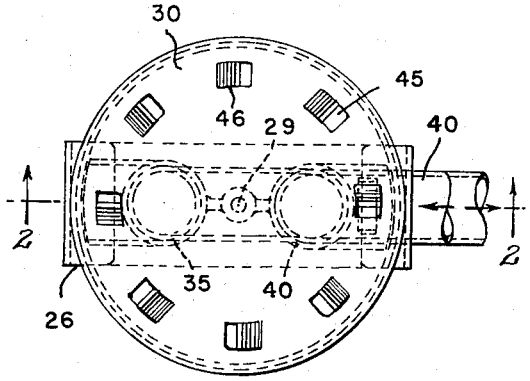
FIG. 3 is a plan view of FIG. 2.

As the baler travels forwardly in the direction of the arrow 12, air borne crop material drifts rearwardly and over engine 22. To minimize wear and provide clean air for operation of the engine, an air cleaner 25 is provided constructed according to this invention. As shown in detail in FIGS. 2 and 3, the air cleaner comprises a support 26 which carries a rotor 28. The rotor includes a vertically extending shaft 29 rotatable relative to support 26. At its upper end shaft 29 is connected to a disc shaped cover 30 from which a cylindrical screen 31 extends downwardly and concentric to the axis of shaft 29. Screen 31 has an inside surface 32 and an outside surface 34.

For conducting air to engine 22, an air inlet duct 35 is provided having an open end 36 which communicates with the inside surface 32 of screen 31 and in a location rearwardly of the direction of travel of the baler. Air is drawn into duct 35 as indicated by the arrows 38. The air travels to an engine intake air filter, not shown.

The exhaust gases from the engine are discharged through an exhaust duct 40 having an outlet end 41 adjacent the inside 32 of the screen 31 and in a location facing forwardly relative to the direction of the travel of the implement and diametrically opposite the end 36 of inlet duct 35. The exhaust gases blow outwardly as indicated by the arrows 42.

Adjacent the outlet end 41 of exhaust duct 40 is a port 44 through which a portion of the exhaust gas is discharged upwardly toward air cleaner cover 30. The cover is provided with angularly spaced openings 45 having vanes or tabs 46 against which the air coming from the port 44 is directed. The engagement of the port gas with vanes 46 causes cover 30 to rotate and shaft 29 turns on bearing supports 48. The rotation of the screen 31 presents successive angular portions of screen 31 to the outlet end 41 of the exhaust pipe 40. The discharging gases blow material from the screen and the cleaned portions of the screen then travel around to the open end 36 of inlet duct 35. As a result, the portion of screen in register with the inlet duct 35 is always clean and free of material. Any material subsequetly picked up as the screen continues to rotate is blown therefrom as it passes the exhaust duct 40.

With this design, a portion of the exhaust gas from engine 22 is used to rotate the screen of the air cleaner to thereby insure the inlet of clean air to the engine. This greatly increases the operative life of the engine and lessens repair problems. The structure described is simply designed and no auxiliary power source is employed to operate the cleaner. Instead of wasting the exhaust gases, they are utilized to operate the air cleaner and achieve desired air cleaning results.

Although air cleaner 25 is particularly adaptable for use on agricultural implements, it lends itself to use in many environments. The low cost of manufacture of the cleaner lends the structure suitable for relatively inexpensive, small, gasoline engines.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. An air cleaner for a combustion engine comprising a support, a rotor carried on said support, a screen carried on said rotor, said screen having an inside and an outside surface, an air inlet duct having an end adjacent one location along the inside of said screen to receive air passed through the screen from the outside and conduct the air to an opposite end communicating with the engine, an exhaust duct having one end receiving gases from the engine and conducting them to an opposite end adjacent another location along the inside of said screen to eject the gases through the screen to the outside, said rotor having vanes thereon, and said exhaust duct having a port through which a portion of the engine gases pass, said port and vanes being so located relative to each other that the gases moving through the port pass over said vanes and rotate said rotor whereby successive portions of said screen pass the opposite end of said exhaust duct to have material cleaned therefrom after which such portions pass said inlet duct.

2. An air cleaner for a combustion engine mounted on an implement which travels in a forward direction, air borne matter coming into contact with the engine from the front, comprising a fixed support, a rotor carried on said support and rotatable about a vertical axis, a cylindrical screen on said rotor and concentric to said axis, said screen having an inside and an outside surface, an air inlet duct having an open end adjacent the inside of said screen at a rearward angular position relative to said direction of travel, said inlet duct conducting air to the engine, an exhaust duct which receives gases from the engine and conducts them to adjacent the inside of the screen at a forward angular position substantially diametrically opposite said inlet duct open end, said exhaust duct having a port through which a portion of the gas escapes, and vanes on said rotor over which the port gases are passed to thereby rotate said screen and move successive angular portions past the exhaust duct and then to the inlet duct.

3. An air cleaner for a combustion engine comprising a fixed support, a rotor carried on said support and rotatable about a given axis, said rotor comprising a shaft and a disc-shaped cover fixed to one end of said shaft, a cylindrical screen on said rotor depending from the periphery of said disc, said screen having an inside and an outside surface, an air inlet duct extending into the interior of said screen and having one end adjacent a first circumferential location along the inside surface of said screen and through which air is conducted to the engine, an exhaust duct extending into the interior of the screen and having a portion which extends generally parallel to said disc, said exhaust duct having an open end adjacent to and facing the inside surface of said screen at a second circumferential location spaced from said first circumferential location, means for driving said rotor comprising a port in said generally parallel portion adjacent said disc at a given distance from said axis and through which a portion of the engine gas escapes, and said disc being provided with vertically extending inclined vanes so located relative to said port that gases moving through the port pass against the vanes.

4. An air cleaner for a combustion engine as recited in claim 3 wherein said inlet and exhaust ducts are located at diametrically opposed points along said screen inside.

5. An air cleaner for a combustion engine as recited in claim 3 wherein said cylindrical screen is concentric to said rotor axis.

References Cited by the Examiner
UNITED STATES PATENTS

| | | | |
|---|---|---|---|
| 1,701,782 | 2/1929 | Kogstrom | 55—405 |
| 2,474,478 | 6/1949 | Hart | 55—290 |
| 2,795,291 | 6/1957 | Pierce | 55—290 |
| 2,823,656 | 2/1958 | Dolza | 55—302 |
| 3,186,389 | 6/1965 | Sylvan | 55—290 X |

FOREIGN PATENTS 683,986   3/1930   France.

HARRY B. THORNTON, *Primary Examiner.*